United States Patent [19]
Arai et al.

[11] Patent Number: 5,880,584
[45] Date of Patent: Mar. 9, 1999

[54] HYBRID SENSOR INCLUDING A FIVE-INPUT-THREE-INPUT CONVERTER GENERATING A HYBRID SIGNAL

[75] Inventors: Takashi Arai; Hiroyuki Kuki; Hideo Seki, all of Saitama-ken, Japan

[73] Assignee: Honda Giken Kogyo Kabushiki Kaisha, Tokyo, Japan

[21] Appl. No.: 786,375

[22] Filed: Jan. 17, 1997

[30] Foreign Application Priority Data

Jan. 19, 1996 [JP] Japan .................................. 8-007523

[51] Int. Cl.$^6$ .............................. G01P 3/48; G01P 3/54; G01H 1/02
[52] U.S. Cl. ......................... 324/166; 324/226; 324/227; 374/142
[58] Field of Search ............................. 324/207.23, 227, 324/225, 174, 175, 226, 160, 166; 340/870.11, 870.16, 870.18; 374/141, 142

[56] References Cited

U.S. PATENT DOCUMENTS 4,644,787  2/1987  Boucher et al. ........................ 324/174
5,500,585  3/1996  Aab ........................................ 324/165

*Primary Examiner*—Walter E. Snow
*Attorney, Agent, or Firm*—Nikaido Marmelstein Murray & Oram, LLP

[57] ABSTRACT

A revolution-speed/temperature hybrid sensor includes a hybrid sensor unit which has a five-input-three-output convertor and outputs a revolution-speed/temperature hybrid signal, and a revolution-speed/temperature detector for separating the revolution-speed/temperature hybrid signal. The five-input-three-output convertor has an adder for adding the revolution speed signal of pulse waveform and temperature signal of analog form so as to generate a revolution-speed/temperature hybrid signal. By virtue of the five-input-three-output convertor, the revolution-speed/temperature hybrid sensor requires a smaller number of harnesses and is downsized compared to a conventional arrangement.

4 Claims, 7 Drawing Sheets

HYBRID SENSOR INCLUDING A FIVE-INPUT-THREE-INPUT CONVERTER GENERATING A HYBRID SIGNAL

BACKGROUND OF THE INVENTION

1. Field of the Invention

The present invention relates generally to a revolution-speed/temperature hybrid sensor and, more particularly to a revolution-speed/temperature hybrid sensor having a sensor unit with a five-input-three-output convertor.

2. Description of the Related Art

Conventionally, a revolution-speed sensor is known in which a Hall element, a magnetic reluctance element or a photocoupler is used for detecting a rotational speed of a rotary element in, for example, automobiles. Similarly, a temperature sensor is known in which a thermistor or a diode is used for temperature sensing.

Reference is now made to FIG. 7 hereof in which a conventional revolution-speed sensor unit and a temperature sensor are shown in block diagram.

As shown in FIG. 7, the revolution-speed sensor unit 20 is comprised of a Hall element 21, a waveform shaping circuit 22, a constant voltage circuit 23, and three terminals $T_{O1}$, $T_{O2}$, $T_{O3}$. The temperature sensor 24 is comprised of a temperature sensor 25 which is composed of a thermistor or a diode, and two terminals $T_{O4}$, $T_{O5}$.

The terminals $T_{O1}$ and $T_{O3}$ of the revolution speed sensor unit 20 are respectively connected to a plus and a minus terminal of a battery B. As a positive voltage $V_B$ is supplied from the battery B to the terminal $T_{O1}$, the constant voltage circuit 23 generates a constant voltage $V_C$ out of a constant voltage $V_B$ and supplies the resultant constant voltage $V_C$ to the Hall element 21 and the waveform shaping circuit 22.

The Hall element 21 detects a change in magnetic field arising from the rotation of the rotary element and outputs a revolution speed signal $S_{VO}$ to the waveform shaping circuit 22. The waveform shaping circuit 22 transforms the revolution speed signal $S_{VO}$ through amplitude limited amplification into a pulse waveform of predetermined amplitude and outputs the latter as a revolution speed signal $S_V$ to the terminal $T_{O2}$.

Generally, the Hall element 21 and waveform shaping circuit 22 comprise an integral Hall IC (integrated circuit).

A temperature sensor employing a thermistor, a diode or the like is designed to achieve temperature sensing utilizing changes in electrical characteristics caused by temperature changes and outputs a sensed temperature as a temperature signal $S_{TO}$ to the terminals $T_{O4}$, $T_{O5}$.

To detect a revolution speed and obtain a corresponding revolution speed signal by use of the revolution speed sensor employing the Hall element 21, at least three terminals are required. Similarly, it is necessary for the temperature sensor employing the thermistor, diode, etc. to have two terminals to generate and output a temperature signal. Thus, for outputting the respective signals, the two sensors need to have five terminals (four terminals when the ground is a common or shared terminal; three terminals when the ground is a body earth).

As explained above, five terminals are required for obtaining revolution speed and temperature signals by using the conventional revolution speed sensor employing a Hall element and temperature sensor employing a thermistor or a diode. Additionally, five harnesses (four harnesses when the ground is a common or shared terminal; three terminals when the ground is a body earth) are required for generating and transmitting the two signals. As a result, an associated coupler inevitably becomes large in size, thus rendering the relevant operations difficult to carry out smoothly and efficiently.

SUMMARY OF THE INVENTION

According to an aspect of the present invention, a revolution-speed/temperature hybrid sensor comprises a five-input-three-output convertor, a hybrid sensor unit for outputting a revolution-speed/temperature hybrid signal, and a revolution-speed/temperature signal detector for separating the revolution-speed/temperature hybrid signal. The five-input-three-output convertor includes an adder for adding the revolution speed signal of pulse waveform and temperature signal in the form of analog and generating the revolution-speed/temperature hybrid signal. Since the revolution-speed/temperature hybrid sensor has a five-input-three-output convertor, required harnesses can be reduced in number, whereby a coupler can be downsized.

The revolution speed signal is obtained by detecting the rotation of a rotary element by means of the revolution speed sensor and then shaping the detected value into a pulse waveform of predetermined amplitude by means of a waveform shaper. In an embodiment described herein, the revolution speed sensor is comprised of a Hall element or a photosensor. The temperature signal is generated by the temperature sensor. The temperature sensor is comprised of a diode or a thermistor. When the diode is used, temperature characteristics of the foreward voltage of the diode is used for temperature sensing while, when the thermistor is used, the temperature sensing is effected utilizing temperature characteristics of the electric resistance of the thermistor. The hybrid sensor further includes a constant current circuit for supplying a constant current to the temperature sensor.

The revolution-speed/temperature signal detector divides the revolution-speed/temperature hybrid signal output from the hybrid sensor unit into a revolution speed signal and a temperature signal and outputs the latter signals separately.

To obtain the revolution speed signal, the revolution-speed/temperature signal detector is comprised of a differentiator, a positive/negative differential waveform separator and a revolution speed signal regenerator. The differentiator generates positive and negative differential signals by differentiating the revolution-speed/temperature hybrid signal output from the five-input-three-output convertor. The positive/negative differential waveform separator separates the positive and negative differential signals to generate two positive digital signals. The revolution speed signal regenerator regenerates a digital revolution speed signal out of the two separated positive digital signals.

The revolution-speed/temperature signal detector further comprises a low-level retainer so as to obtain the temperature signal. The low-level retainer regenerates an analog temperature signal out from the revolution-speed/temperature hybrid signal.

While the thus-arranged revolution-speed/temperature signal detector is simple in construction, it can separate and regenerate the revolution speed signal of pulse waveform and temperature signal in the form of analog out from the revolution-speed/temperature hybrid signal. As a result, a revolution-speed/temperature hybrid sensor is provided which is less costly and allows easy installation and handling operations thereof.

BRIEF DESCRIPTION OF THE DRAWINGS

A preferred embodiment of the present invention will be described hereinbelow with reference to the accompanying drawings, in which.

DETAILED DESCRIPTION OF THE PREFERRED EMBODIMENT

Figure 1:
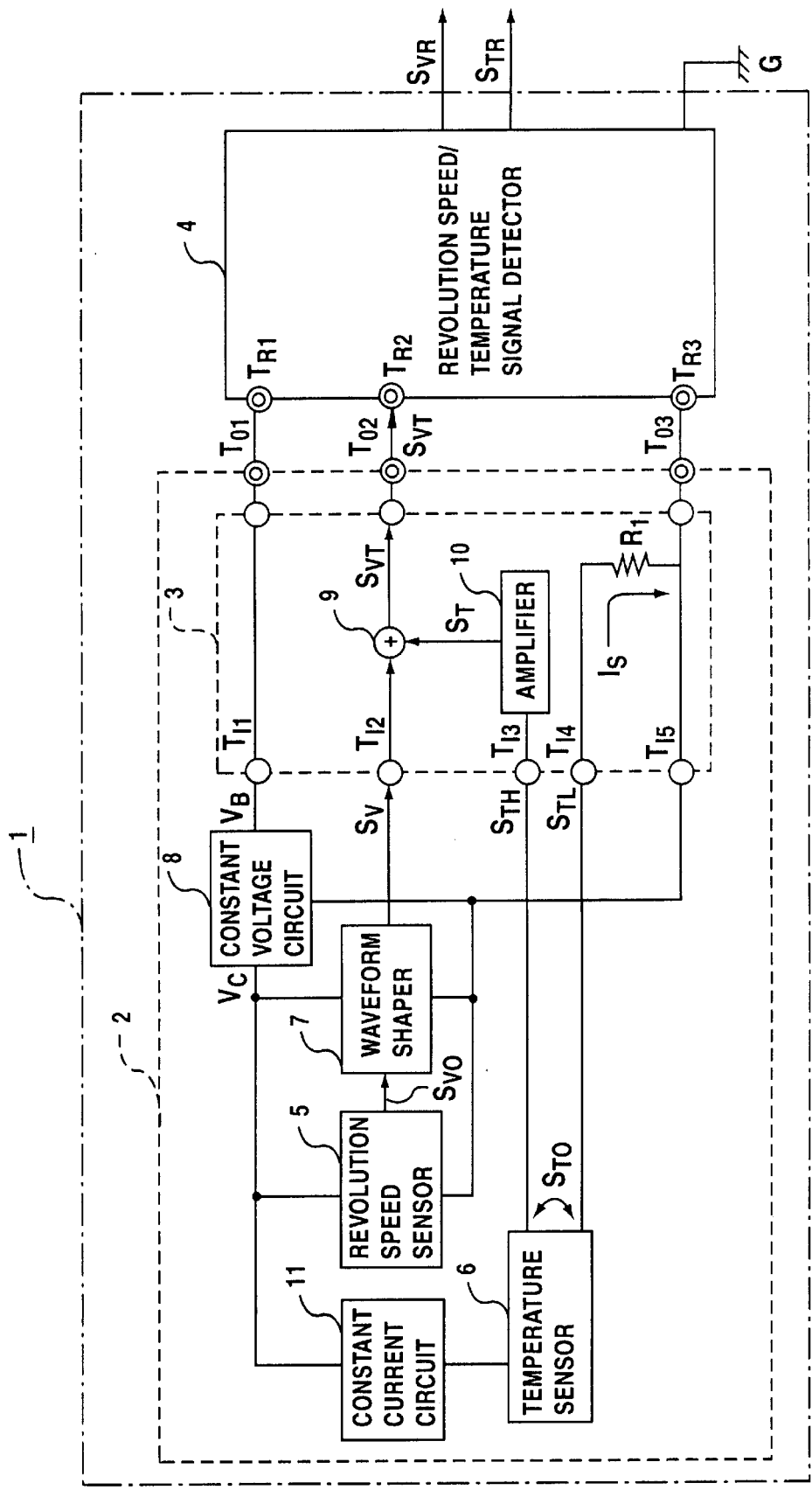
FIG. 1 is a block diagram illustrating the general arrangement of a revolution-speed/temperature hybrid sensor unit according to the present invention.

Referring to FIG. 1, revolution-speed/temperature hybrid sensor 1 includes a hybrid sensor unit 2 for outputting a hybrid signal by adding a revolution speed signal of pulse waveform and a temperature signal in the form of analog, and a revolution-speed/temperature signal detector 4 for detecting a revolution speed signal and a temperature signal out from the hybrid signal.

The hybrid sensor unit 2 is comprised of a five-input-three-output convertor 3 having an adder 9 and an amplifier 10, a revolution speed sensor 5, a temperature sensor 6, a waveform shaper 7, a constant voltage circuit 8, and a constant current circuit 11.

The revolution speed sensor 5 detects the rotation of a rotary member by means of a Hall element or a photosensor and outputs a revolution speed signal $S_{VO}$ as a pulse signal corresponding to the revolution speed to the waveform shaper 7.

Through amplitude-limited amplification, the waveform shaper 7 shapes the revolution speed signal $S_{VO}$ into a pulse waveform of predetermined amplitude and outputs the latter as a revolution speed signal $S_V$ to an input terminal $T_{I2}$ of the five-input-three-output convertor 3.

The temperature sensor 6 is comprised of a diode or a thermistor. When the diode is used, temperature sensing is effected utilizing temperature characteristics of the foreward voltage of the diode. When the thermistor is used, temperature sensing is effected utilizing temperature characteristics of the electric resistance of the thermistor. Temperature signal $S_{TO}$ is input to an input terminal $T_{I3}$ and an input terminal $T_{I4}$ of the five-input-three-input convertor 3.

Positive (plus) and negative (minus) terminals of a battery not shown are connected to output terminals $T_{O1}$ and $T_{O3}$ of the five-input-three-output convertor 3. Battery voltage $V_B$ (12 V) is supplied from input terminals $T_{I1}$ and $T_{I5}$ to an input side of the constant voltage circuit 8. The constant voltage circuit 8 generates a predetermined constant voltage $V_C$ (5 V) from the battery voltage $V_B$ supplied to the input side thereof and supplies the constant voltage $V_C$ to the revolution speed sensor 5, waveform shaper 7 and temperature sensor 6.

The five-input-three-output convertor 3 is comprised of five input terminals $T_{I1}$, $T_{I2}$, $T_{I3}$, $T_{I4}$, $T_{I5}$, three output terminals $T_{O1}$, $T_{O2}$, $T_{O3}$, amplifier 10 for amplifying the temperature signal $S_{TO}$ input to the input terminals $T_{I3}$, $T_{I4}$ to output a temperature signal $S_T$, and adder 9 which adds up the revolution speed signal $S_V$ input to the input terminal $T_{I2}$ and temperature signal $S_T$ and outputs a revolution-speed/ temperature hybrid signal $S_{VT}$ to the output terminal $T_{O2}$.

Thus, by virtue of the five-input-three-output convertor 3 with the amplifier 10 and adder 9, the inventive arrangement needs to have only three terminals while the conventional arrangement requires five terminals for processing and transmitting the revolution speed and temperature signals, including a source of power supply.

Figure 2:
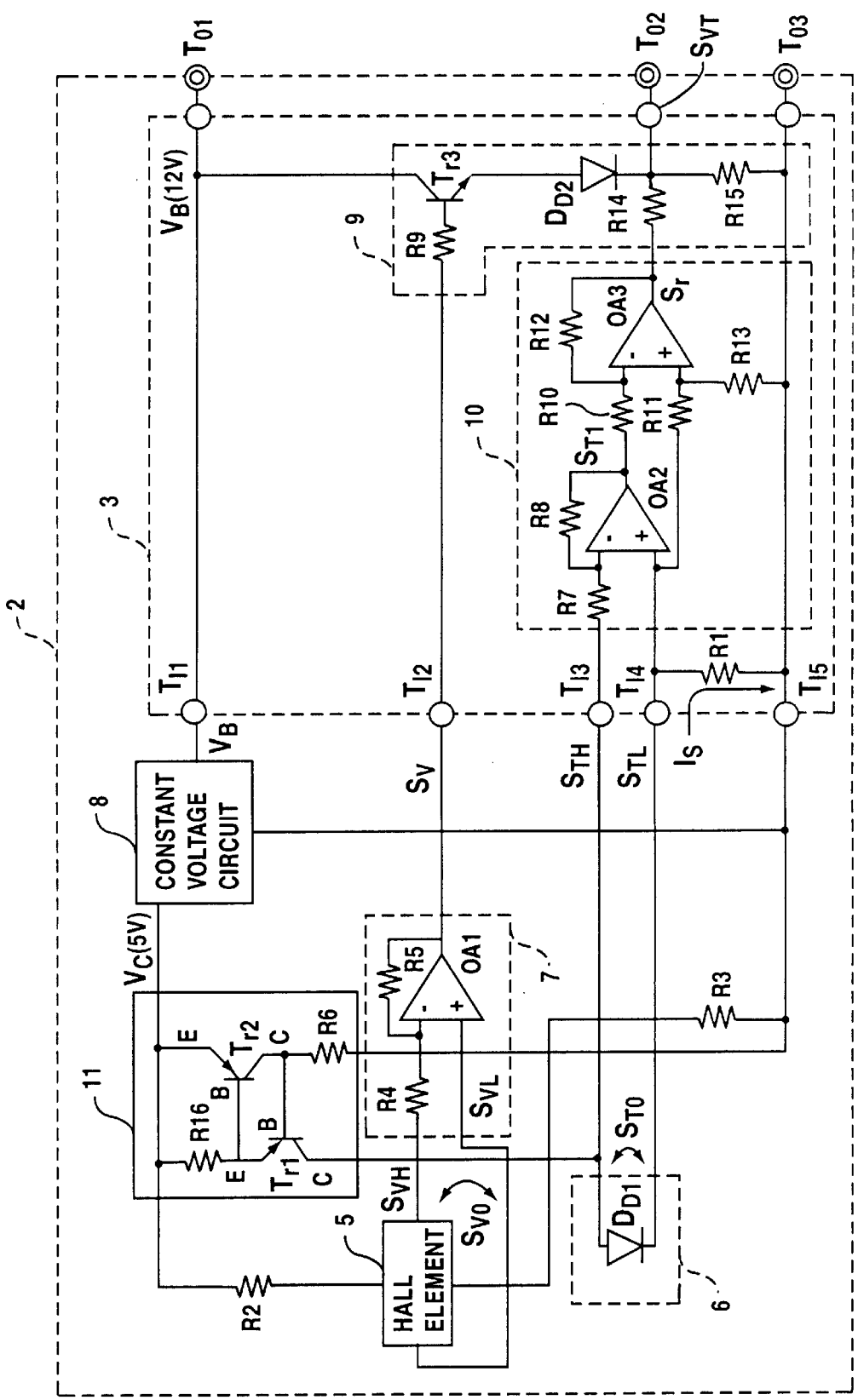
FIG. 2 is a circuit diagram illustrating an electrical circuit of the hybrid sensor unit shown in FIG. 1.

Referring now to FIG. 2, the hybrid sensor unit 2 is comprised of the five-input-three-output convertor 3 having the adder 9 and amplifier 10, Hall element 5 as the revolution speed sensor, diode $D_{D1}$ as the temperature sensor 6, waveform shaper 7, constant voltage circuit 8, and constant current circuit 11.

The constant current circuit 11 is composed of paired transistors $T_{R1}$, $R_{R2}$ with the same characteristics and resistors R6, R16 and supplies a constant current $I_S$ (=$V_{BE}$/R16) to the diode $D_{D1}$ and resistor $R_1$ where the transistor $T_{r2}$ has the base-emitter voltage of $V_{BE}$.

Figure 3:
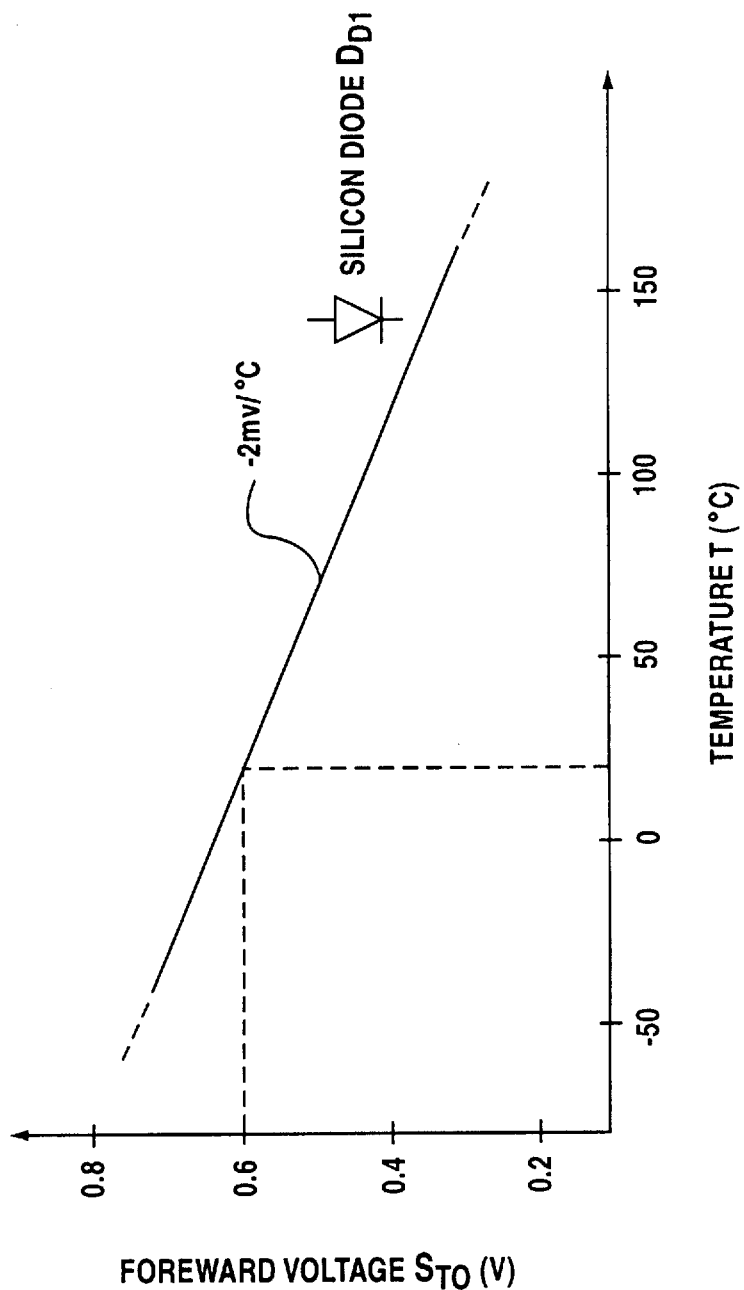
FIG. 3 is a graph illustrating the foreward voltage $S_{TO}$ (V)— temperature T(20 C.) characteristics of a silicon diode.

Characteristics of the forward voltage $S_{TO}$ (V) of the diode $D_{D1}$ relative to the temperature T (°C.) is shown in FIG. 3. In the characteristics curve of FIG. 2, a silicon diode is used as the diode $D_{D1}$. The silicon diode $D_{D1}$ has a negative temperature coefficient. The foreward voltage $S_{TO}$ (V) decreases as the temperature increases. When temperature sensing is effected utilizing the temperature characteristics of the foreward voltage $S_{TO}$ (V) of the diode $D_{D1}$, the foreward current of the diode $D_{D1}$ needs to be kept constant since the foreward voltage $S_{TO}$ (V) of the diode $D_{D1}$ varies with the foreward current of the diode $D_{D1}$. Thus, the constant current circuit 11 is provided to constantly supply a constant current $I_S$ to the diode $D_{D1}$. The constant current $I_S$ of the constant current circuit 11 is not influenced by changes in the power source voltage ($V_C$) or by changes in the temperature of the paired transistors $T_{r1}$, $T_{r2}$, thus providing a constant current. Consequently, a foreward current $I_S$ is always flowing through the silicon diode $D_{D1}$, whereby the foreward voltage $S_{TO}$ (V) is supplied as a temperature signal $S_{TO}$ to the two input terminals $T_{I3}$, $T_{I4}$ of the five-input-three-output convertor 3.

The Hall element serving as the revolution speed sensor 5 has four terminals, is fed with a constant voltage $V_C$ from the constant voltage circuit 8 via the resistors R2, R3, detects the rotation of the rotary element, and outputs a revolution speed signal $S_{VO}$, which is a pulse signal corresponding to the revolution speed, to the waveform shaper 7.

The waveform shaper 7 is comprised of an operational amplifier OA1 and resistors R4, R5. To a power source terminal, not shown, of the operational amplifier OA1, $V_C$ (5 V) of a single power source is supplied. The waveform shaper 7 shapes the revolution speed signal $S_{VO}$ through amplitude limited amplification into a pulse waveform of TTL (Transistor-Transistor Logic) level and outputs the resultant as a revolution speed signal $S_V$ to the input terminal $T_{I2}$ of the five input-three-output convertor 3.

The amplifier 10 of the five-input-three-output convertor 3 is comprised of two operational amplifiers OA2, OA3 and a plurality of resistors R1, R7, R8, R10, R11, R12, R13. To a power source terminals, not shown, of the operational amplifiers OA2, OA3, a single power source voltage $V_B$ (5 V) is supplied.

The resistor R1 provides a non-inverting input terminal of the operational amplifier OA2 with a bias of $S_{TL}$ (V), which is a direct-current voltage determined by (constant current $I_S$)×(resistor R1).

The operational amplifier OA2 amplifies the temperature signal $S_{TO}$ and outputs the resultant as a temperature signal $S_{T1}$ to a succeeding operational amplifier OA3. The temperature Signal $S_{T1}$ output from the operational amplifier OA2 is obtained by the calculation: $S_{T1}=S_{TL}-S_{TO}\times R8/R7$.

Since the operational amplifier OA2 uses a single power source, it is necessary for the bias voltage $S_{TL}$ (V) and resistors R7, R8 to be set at values such that $S_{TL}>S_{TO}\times R8/R7$ is satisfied.

The operational amplifier OA3 subtracts the bias voltage $S_{TL}$ from the temperature signal $S_{T1}$ ($S_{TL}-S_{TO}\times R8/R7$) output from the operational amplifier OA2 and outputs a value, obtained by increasing the foreward voltage $S_{TO}$ (V) of the diode $D_{D1}$ by R8/R7 times, as a temperature signal $S_T$ to the adder 9, where the resistors R10, R11, R12, R13 are set at values which satisfy the relation of R10=R11=R12=R13.

The adder 9 is comprised of a transistor $T_{r3}$, three resistors R9, R14, R15 and a diode $D_{D2}$. The adder 9 adds up the revolution speed signal $S_V$ output from waveform shaper 7 and temperature signal $S_T$ output from the amplifier 10 and outputs the added value as a revolution-speed/temperature hybrid signal $S_{VT}$ to the output terminal $T_{o2}$.

Figure 4:
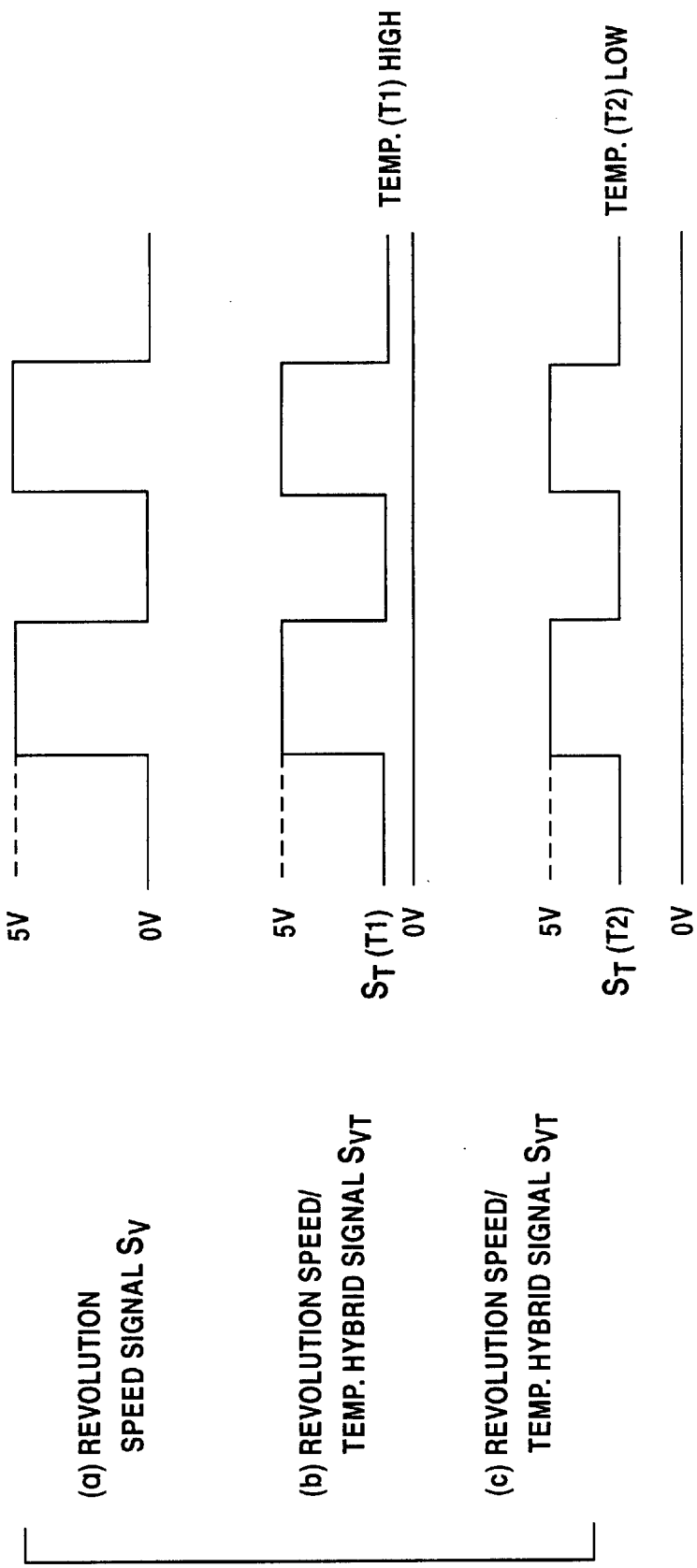
FIG. 4 illustrates the waveforms of a revolution-speed/ temperature hybrid signal $S_{VT}$ in an adder shown in FIG. 2.

FIG. 4 shows waveforms of the revolution-speed/temperature hybrid signals $S_{VT}$ of the adder 9 of FIG. 2.

Shown in (a) of FIG. 4 is a waveform of the revolution speed signal $S_V$ shaped into a TTL level waveform. (b) and (c) of FIG. 4 show waveforms of the revolution-speed/temperature hybrid signal $S_{VT}$ obtained by adding up the temperature signal $S_T$ and revolution speed signal $S_V$.

(b) of FIG. 4 shows a waveform of the revolution-speed/temperature hybrid signal $S_{VT}$ which is amplitude limited, when the temperature signal $S_T$ of analog quantity at a high temperature T1 and the revolution speed signal $S_V$ are added and when the power source voltage is $V_C$ (5 V)(see FIG. 2).

Shown in (c) of FIG. 4 is a waveform of the revolution-speed/temperature hybrid signal $S_{VT}$ which is amplitude limited, when the temperature signal $S_T$ of analog quantity at a low temperature T2 and the revolution speed signal $S_V$ are added up and where the power source voltage is $V_C$ (5 V) (see FIG. 2).

As explained above, the hybrid sensor unit according to the present invention has the five-input-three-output convertor having the adder for generating the revolution-speed/temperature hybrid signal by adding up the temperature signal obtained by converting the temperature detected by the temperature sensor into an electrical signal of analog form and the revolution speed signal of pulse waveform. As a result, the number of harnesses can be reduced, thus downsizing a coupler.

Further, the hybrid sensor unit with less harnesses and downsized coupler enables easy mounting thereof to, for example, a transmission in an automobile while, when mounted thereto, it achieves precise detection of the number of revolutions of a rotary element in the transmission and of an oil temperature within the transmission.

Figure 5:
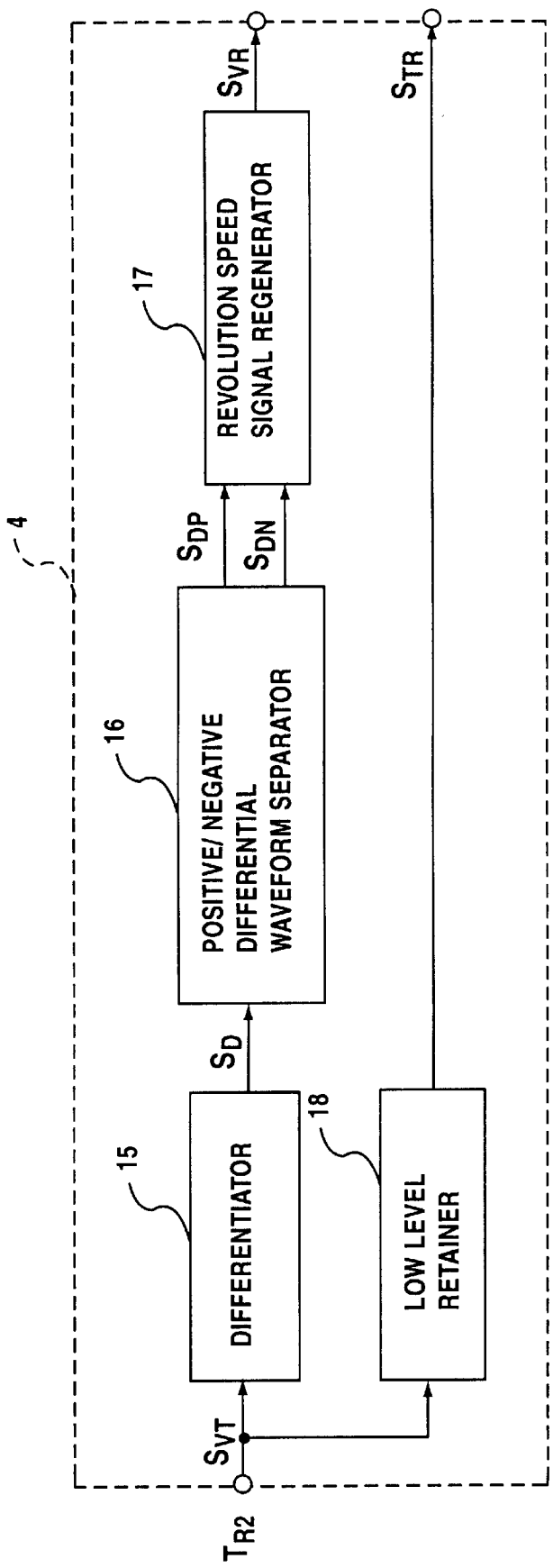
FIG. 5 is a block diagram illustrating the revolution-speed/temperature signal detector shown in FIG. 1.

Reference is now made to FIG. 5 showing, in block diagram, the arrangement of the revolution-speed/temperature signal detector 4 of FIG. 1.

In FIG. 5, the revolution-speed/temperature signal detector 4 to composed of a differentiator 15, a positive/negative differential signal separator 16, a revolution speed signal regenerator 17 and a low level retainer 18.

The revolution-speed/temperature hybrid signal $S_{VT}$ output from the five-input-three-output convertor 3 of the hybrid sensor unit 2 shown in FIG. 1 is input to the differentiator 15 of the revolution-speed/temperature signal detector 4 and low level retainer 18.

The differentiator 15 differentiates the revolution-speed/temperature hybrid signal $S_{VT}$ and generates positive and negative differential signals $S_D$.

The positive/negative differential signal separator 16 separates positive and negative differential signals in the differential signal $S_D$ and generates two positive differential signals $S_{DF}$, $S_{DN}$.

The revolution speed signal regenerator 17 regenerates a revolution speed signal $S_{VR}$ from the two positive differential signals $S_{DP}$, $S_{DN}$.

The low level retainer 18 detects and retains a temperature signal $S_T$ (T) (see FIG. 4) which is an analog quantity of the revolution-speed/temperature hybrid signal $S_{VT}$ and regenerates a temperature signal $S_{TR}$.

Figure 6:
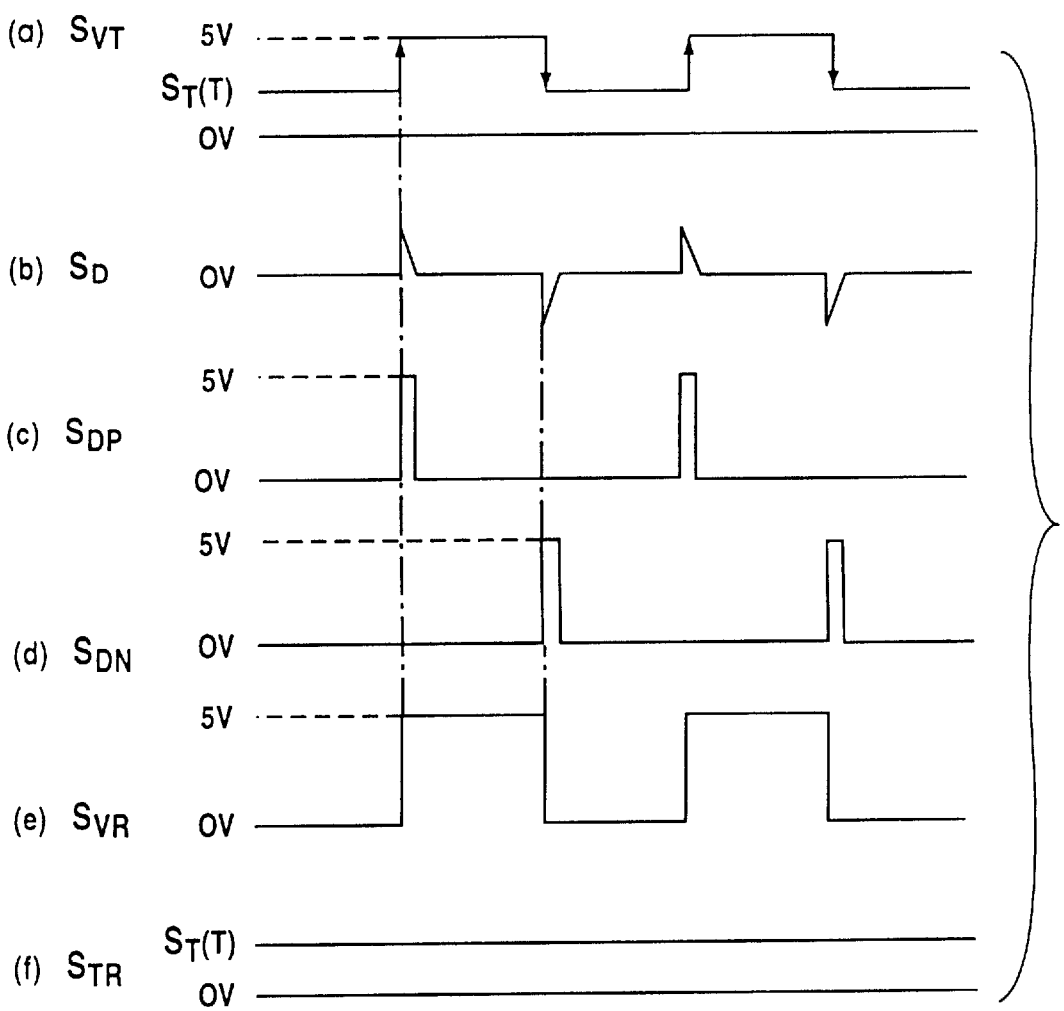
FIG. 6 is a time chart relating to the block diagram shown in FIG. 5.
Figure 7:
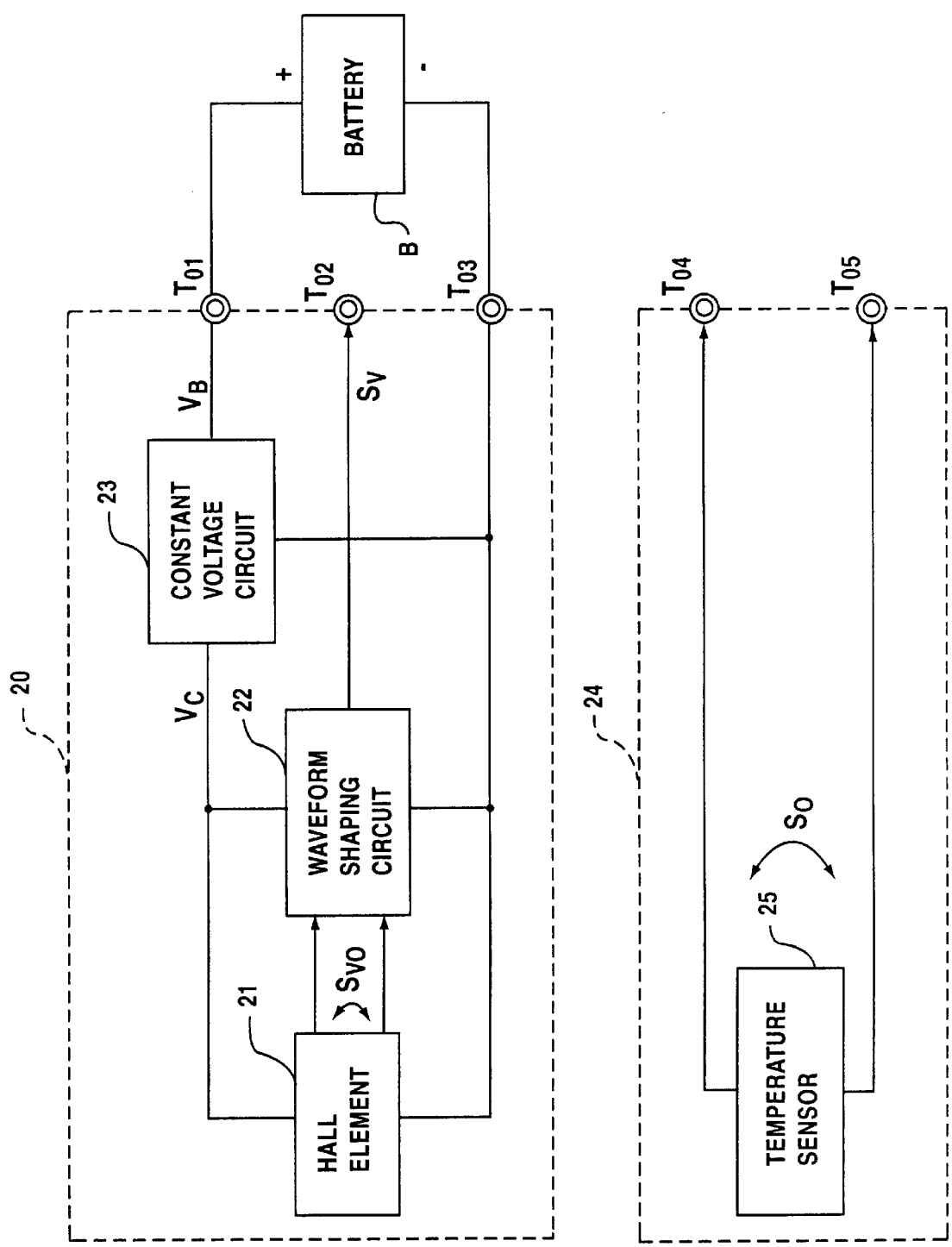
FIG. 7 is a block diagram illustrating a conventional revolution speed sensor unit and a temperature sensor.

FIG. 6 is a time chart illustrating the operation of the revolution-speed/temperature signal detector 4 of FIG. 5.

In (a) of FIG. 6, a revolution-speed/temperature hybrid signal $S_{VT}$ is shown which has been obtained by adding the revolution speed signal of pulse waveform and temperature signal of analog form.

Shown in (b) of FIG. 6 is a differential signal $S_D$ obtained through differentiation of the revolution-speed/temperature hybrid signal $S_{VT}$.

(c) of FIG. 6 shows a positive digital signal $S_{DF}$ corresponding to a positive differential signal in the differential signal $S_D$.

Shown in (d) of FIG. 6 is a positive digital signal $S_{DN}$ corresponding to a negative differential signal in the differential signal $S_D$.

(e) of FIG. 6 shows a revolution speed signal $S_{VR}$ regenerated from the two positive differential signals $S_{DP}$, $S_{DN}$.

In (f) of FIG. 6, a temperature signal $T_{TR}$ is shown which has been obtained by detecting and regenerating the temperature signal $S_T$ (T) which is an analog quantity of the revolution-speed/temperature hybrid signal $S_{VT}$.

As explained above, the inventive arrangement includes the revolution-speed/temperature hybrid sensor which has the revolution-speed/temperature signal detector for regenerating the revolution speed signal of pulse waveform and temperature signal of analog form from the revolution-speed/temperature hybrid signal output from the five-input-three-output convertor. As a result, the arrangement is capable of detecting with good accuracy the revolution speed signal and temperature signal by separating the same from the revolution-speed/temperature hybrid signal while it is simple in construction.

As thus far explained, the inventive revolution-speed/temperature hybrid sensor including a revolution speed sensor and a temperature sensor, comprises a hybrid sensor unit having a five-input-three-output convertor provided with an adder for adding a revolution speed signal of digital form detected by the revolution speed sensor and a temperature signal of analog form detected by the temperature sensor so as to generate a revolution-speed/temperature hybrid signal. Consequently, the hybrid sensor requires a smaller number of harnesses and enables downsizing of a coupler, whereby a revolution-speed/temperature hybrid sensor, which is less costly and easy to handle, is provided.

Further, by securing the revolution-speed/temperature sensor to, for example, a transmission of an automobile, precise sensing of the number of revolution of a rotary element and an oil temperature in the transmission is enabled. Such precise number of revolutions of the rotary element and precise oil temperature in the transmission may be fed to a vehicle controller so that the latter can achieve transmission most suited to a driving condition.

The revolution-speed/temperature hybrid sensor according to the present invention differentiates a revolution-speed/temperature hybrid signal output from the hybrid sensor unit, generates positive and negative differential signals, produces two positive digital signals from the positive and negative differential signals and regenerates a revolution speed signal of digital form from the two positive digital signals. The hybrid sensor also regenerates a temperature signal of analog form from the revolution-speed/temperature hybrid signal. To sum up, revolution speed and temperature sensing is enabled by the hybrid sensor which is simple in construction and capable of separating a revolution speed signal and a temperature signal from the revolution-speed/temperature hybrid signal. Consequently, a revolution-speed/temperature hybrid sensor, which is inexpensive and easy to handle, is provided.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A hybrid sensor for converting signals input from a revolution speed sensor and a temperature sensor into a hybrid signal and for outputting the hybrid signal to a signal detector, said hybrid sensor comprising:

a hybrid sensor unit having a five-input-three-output convertor with an adder for adding a revolution speed signal of digital form detected by said revolution speed sensor and a temperature signal of analog form detected by said temperature sensor and for generating a revolution-speed/temperature hybrid signal; and a revolution-speed/temperature signal detector for detecting said revolution speed signal and said temperature signal by separating said revolution speed and temperature signal from said revolution-speed/temperature hybrid signal.

2. A hybrid sensor according to claim 1, further comprising a constant current circuit for supplying a constant current to said temperature sensor.

3. A hybrid sensor according to claim 1, wherein said revolution-speed/temperature signal detector includes:

a differentiator for differentiating said revolution-speed/temperature hybrid signal output from said five-input-three-output convertor to generate positive and negative differential signals;

a positive/negative differential waveform separator for generating two positive digital signals by separating said positive and negative differential signals;

a revolution speed signal regenerator for regenerating a revolution speed signal of digital form from said two separated positive digital signals: and a low level retainer for detecting a temperature signal of analog form from said revolution-speed/temperature hybrid signal.

4. A hybrid sensor according to claim 1, wherein said five-input-three-output converter comprises:

a first input terminal for inputting a positive power source voltage;

a second input terminal for inputting the revolution speed signal of digital form;

third and fourth input terminals for inputting the temperature signal of analog form;

a fifth input terminal for inputting a negative power source voltage;

a first output terminal for outputting the positive power source voltage;

a second output terminal for outputting the hybrid signal composed of the revolution speed signal of digital form and the temperature signal of analog form; and a third output terminal for outputting the negative power source voltage.

* * * * *